(12) United States Patent
Jagadeesh

(10) Patent No.: US 11,088,927 B2
(45) Date of Patent: Aug. 10, 2021

(54) SDN CONTROLLER, SYSTEM AND METHOD FOR TASK SCHEDULING, RESOURCE PROVISIONING AND SERVICE PROVIDING

(71) Applicant: Huawei Technologies Co., Ltd., Shenzhen (CN)

(72) Inventor: Pradeep Jagadeesh, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 220 days.

(21) Appl. No.: 16/245,872

(22) Filed: Jan. 11, 2019

(65) Prior Publication Data
US 2019/0166019 A1   May 30, 2019

Related U.S. Application Data

(63) Continuation of application No. PCT/EP2017/067895, filed on Jul. 14, 2017.

(30) Foreign Application Priority Data

Jul. 14, 2016  (EP) ..................................... 16179575

(51) Int. Cl.
*G06F 15/173*   (2006.01)
*H04L 12/24*    (2006.01)
(Continued)

(52) U.S. Cl.
CPC ........ *H04L 41/5054* (2013.01); *H04L 5/0032* (2013.01); *H04L 47/70* (2013.01)

(58) Field of Classification Search
CPC ........................... H04L 41/5054; H04L 47/70
(Continued)

(56) References Cited

U.S. PATENT DOCUMENTS 10,097,627 B1 * 10/2018 Gafton ................ H04L 67/1008
2015/0172101 A1   6/2015 Decusatis et al.
(Continued)

FOREIGN PATENT DOCUMENTS

CN     101957780 A    1/2011
EP       2961100 A1   12/2015

OTHER PUBLICATIONS

Manthena et al, "An SDN-based architecture for Network-as-a-Service," Proceedings of the 2015 1st IEEE Conference on Network Softwarization (NetSoft), pp. 1-5, Institute of Electrical and Electronics Engineers—New York, New York (Jun. 4, 2015).
(Continued)

*Primary Examiner* — Duyen M Doan
(74) *Attorney, Agent, or Firm* — Leydig, Voit & Mayer, Ltd.

(57) ABSTRACT

A software defined network (SDN) controller for task scheduling and/or resource provisioning and/or service providing includes a receiving unit configured to receive a request for scheduling at least one task and/or provisioning at least one resource and/or providing at least one service. The SDN controller further includes a processing unit configured to schedule at least one task and/or provision at least one resource and/or provide at least one service based on the request received by the receiving unit and on an explicit constraint defined in the received request, and/or an implicit constraint imposed by the received request.

20 Claims, 9 Drawing Sheets

(51) Int. Cl.
*H04L 5/00* (2006.01)
*H04L 12/911* (2013.01)

(58) Field of Classification Search
USPC .................................................. 709/203, 223
See application file for complete search history.

(56) References Cited

U.S. PATENT DOCUMENTS

| | | | |
|---|---|---|---|
| 2015/0381515 A1* | 12/2015 | Mattson | H04L 47/70 707/609 |
| 2016/0014787 A1 | 1/2016 | Zhang et al. | |
| 2016/0134623 A1* | 5/2016 | Roth | H04L 9/3268 713/156 |
| 2016/0182397 A1* | 6/2016 | McFarlin | G06F 9/5061 709/226 |

OTHER PUBLICATIONS

Schwarzkopf et al, "Omega: flexible, scalable schedulers for large compute clusters," EuroSys'13 Prague, Czech Republic, pp. 1-14 (Apr. 15-17, 2013).

Zhou et al, "A Method for Load Balancing based on Software-Defined Network," Advanced Science and Technology Letters, vol. 45 (CCA 2014), pp. 43-48 (2014).

* cited by examiner

SDN CONTROLLER, SYSTEM AND METHOD FOR TASK SCHEDULING, RESOURCE PROVISIONING AND SERVICE PROVIDING

CROSS-REFERENCE TO RELATED APPLICATIONS

This application is a continuation of International Application No. PCT/EP2017/067895, filed on Jul. 14, 2017, which claims priority to European Patent Application No. EP16179575.2, filed on Jul. 14, 2016. The disclosures of the aforementioned applications are hereby incorporated by reference in their entireties.

FIELD OF THE INVENTION

The present disclosure relates to the field of task scheduling, resource provisioning and service providing, especially to a software defined network (SDN) controller and method therefore.

The present disclosure in particular provides a computing system and method for task scheduling, resource provisioning and service providing, wherein the computing system includes the SDN controller and at least one agent.

BACKGROUND

SDN is an approach to improve communication networks by decoupling a data plane from a control plane. Thereby, control plane functions are typically provided by a conventional SDN controller, while data plane functions are typically provided by network elements, such as switches. By gathering information from the network elements, the conventional SDN controller has detailed insight into network topology, network traffic, and services in a datacenter, and can provide and control crucial networking functionality and services in the datacenter. In particular, the SDN controller can provide and configure services such as a network service (e.g. provisioning and/or configuration of a network device, a switch, a router, a webserver or a mail server, load balancing, a firewall service, packet inspection, network monitoring, idle resource management or bandwidth configuration).

Further techniques, essential to e.g. operating a datacenter, are task scheduling and resource provisioning. Task scheduling specifies an approach of assigning computation tasks to resources, which process the computation tasks. A computation task may be a basic computation element such as a thread, a process or a data flow, e.g. to be computed by a processor. With respect to resource provisioning, scheduling a computation task can involve preparing local or distributed resources, in order to provide a service to a user, e.g. setting up a virtual machine (VM) in a virtualization environment distributed to a cluster of computing nodes in a datacenter, or performing a computation on a distributed computing cluster. All functionality as described herein with respect to VMs can also be applied to containers. Containers provide a way to process isolated computations on a single computing node.

The resources can be hardware resources such as central processing units (CPUs), system memory (random access memory (RAM), read-only memory (ROM)), system storage (hard drives, flash storage, databases, physical or virtual storage media), graphics processing units (GPUs), input and output (IO) devices, network devices (devices for accessing and using a physical or virtual network, e.g. a local area network (LAN) or wide area network (WAN)), encryption modules (e.g. Trusted Platform Modules (TPMs)), digital signal processors (DSPs), field programmable gate array (FPGAs), co-processors, network packet processing accelerators (e.g. processing units employing algorithms which are applied to packets of data or information as it moves through network components) or expansion cards. Of course, these resources can also be virtualized and, e.g., be part of one or more VMs.

Moreover, the resources can be provided by a single computing unit, as well as by multiple computing units located in one datacenters or being distributed in two or more datacenters that are connected by means of a computer network. Datacenters can provide processing units of a CPU system architecture such as X86, ARM, PowerPC, or SPARC. Also virtualization means can be provided to allow a decoupling of computing operations from the physical hardware resources.

In the prior art, scheduling a task, provisioning a resource, or providing a service can in particular include: managing system or software updates on computing nodes or in a datacenter, taking or restoring snapshots of VMs, in order to process migration of VMs, managing an operating state (e.g. power on, power off, suspend, resume) of a computing node, a VM or a datacenter, managing idle resources, and deploying services, as defined above, to a set of nodes.

In order to decide how to schedule a task or to provision a resource when processing a scheduling and/or resource provisioning request, conventional task scheduling and resource provisioning systems collect task information (e.g. runtime information of a task) and resource information (e.g. information regarding the current workload of a resource) from the data center, and evaluate the collected information. However, existing task schedulers are only able to consider explicit requirements for tasks and resources, e.g. an amount of CPU power or an amount of memory needed when a scheduling and/or resource provisioning request should be processed. It is impossible to detect the requirements implicitly needed by the scheduling and/or resource provisioning request.

Although a conventional SDN controller is of significant relevance in a datacenter, and provides functionality essential to its operation, it does not provide functionality for task scheduling and resource provisioning based on collected task information and resource information. Since the conventional SDN controller does not provide a way for collecting and evaluating the task information and the resource information, the conventional SDN controller is incapable of providing and configuring the services based on the collected and evaluated task information and resource information. In addition, the conventional SDN controller does not allow detecting requirements implicitly needed by a request for providing a network service.

An illustration of a conventional system 100 for task scheduling and resource provisioning in a conventional SDN based datacenter 106 is shown in FIG. 1. In the conventional system 100, a request 101 for scheduling a task and/or provisioning a resource is received by a conventional task scheduler and/or resource provisioner 102. The conventional task scheduler and/or resource provisioner 102 collects task information and resource information from computing nodes 107 in the conventional SDN based datacenter 106, and stores the collected information in a database 104. In order to process the request 101, the task information and the resource information stored in the database 104 can be evaluated by the conventional task scheduler and/or resource provisioner 102. In the conventional system 100, a conventional SDN controller 103 collects information relating to services (e.g. network services) from network elements 108 in the conventional SDN based datacenter 106, and stores the collected information in a separate database 105. In order to process a request for providing a service, the information stored in the separate database 105 can be evaluated by the conventional SDN controller 103. Although the conventional SDN controller 103 can communicate with the conventional task scheduler and/or resource provisioner 102, the conventional SDN controller 103 is incapable of scheduling tasks and/or providing resources based on the task information and resource information stored in the database 104.

As a result, in order to allow for task scheduling and resource provisioning in a conventional SDN based datacenter 106, separate components (i.e. the conventional task scheduler and/or resource provisioner 102 and the conventional SDN controller 103 and the two databases 104, 105) are necessary. This leads to a high number of components applied in the conventional SDN based datacenter 106, and to an increased communication overhead between the involved components, which in turn raises operating costs and time to process the requests.

Further prior art approaches are discussed in the following papers:

Mani Prashanth Varma Manthena et al in "*An SDN-based Architecture for Network-as-a-Service*" (2015, In Proceedings of the 1st IEEE Conference on Network Softwarization (IEEE NetSoft 2015), London, UK, 1-5) describes an SDN-based approach to support an abstract Network-as-a-Service (NaaS) model. NaaS is a cloud-based service model that offers on-demand network connectivity and the provisioning and management of network services.

M. Schwarzkopf et al in "*Omega: Flexible, Scalable Schedulers for large Compute Clusters*" (2013, In Proceedings of the 8th ACM European Conference on Computer Systems (EuroSys '13), ACM, New York, N.Y., USA, 351-364) describes a new scheduler architecture using shared state and lock-free optimistic concurrency control, to improve a schedulers access to a computation cluster.

However, also the further prior approaches do not solve the above-described problems.

SUMMARY

In view of the above-mentioned problems of the conventional approaches, embodiments of the present invention provide improvements over the prior art. Embodiments of the present invention improve task scheduling, resource provisioning and service providing in SDN based environments. To this end, an SDN controller should be provided, which allows for scheduling tasks and/or provisioning resources based on collected task and/or resource information. In particular, the SDN controller should provide and configure services (e.g. network services) based on the collected task information and/or resource information. More specifically, the SDN controller should be able to detect requirements implicitly needed by a request for scheduling a task and/or provisioning a resource and/or providing a network service.

According to a first aspect, the invention provides a software defined network (SDN) controller for task scheduling and/or resource provisioning and/or service providing, including a receiving unit configured to receive a request for scheduling at least one task and/or provisioning at least one resource and/or providing at least one service; and a processing unit configured to schedule at least one task and/or provision at least one resource and/or provide at least one service based on the request received by the receiving unit and on an explicit constraint defined in the received request, and/or an implicit constraint imposed by the received request.

This ensures that the number of components applied in an SDN based datacenter can be decreased, processing time of a request for scheduling a task, provisioning a resource or providing a service that is processed by an SDN controller can be optimized and communication overhead can be reduced. This facilitates to comply with service level agreements (SLA) with customers that use the provided tasks, resources or services. As the SDN controller has a detailed overview of a network topology of the datacenter, it can process requests for scheduling tasks and/or provisioning resources and/or providing services effectively and efficiently. Further, an improved processing of requests received by the SDN controller is achieved, since, when processing the requests, requirements which are imposed implicitly by the request can be considered, additionally to the requirements explicitly included in the requests.

According to a first implementation of the first aspect, the SDN controller further can include a database, configured to store task information, and/or resource information, and/or service information; and a query creation unit configured to extract the explicit constraint defined in the received request, and/or to derive the implicit constraint imposed by the received request, wherein the query creation unit further can be configured to generate a query based on the explicit constraint and/or the implicit constraint; and a constraint solving unit configured to solve constraints in the generated query based on the task information, and/or the resource information, and/or the service information in the database, wherein the constraint solving unit further can be configured to identify a task schedule, and/or a set of resources, and/or a service configuration available for executing the received request based on the generated query and/or the task information, and/or the resource information, and/or the service information; wherein the processing unit further can be configured to schedule the at least one task, and/or provision the at least one resource, and/or provide the at least one service based on the identified task schedule, and/or the identified set of resources, and/or the identified service configuration, and the request received by the receiving unit.

Employing a database that stores task information, and/or resource information, and/or service information allows to improve scheduling tasks, provisioning resources and providing services, as the results are based on fine grained information stored in the database. The query creation unit, which extracts the explicit constraint defined in the received request, and/or derives the implicit constraint imposed by the received request, and generates a query based on the explicit constraint and/or the implicit constraint enables that implicit constraints, which were not explicitly mentioned by a user who sent the request, can be considered when processing the request. This improves overall processing efficiency of the received requests, since more information can be considered when processing the request. Employing a constraint solving unit ensures further that the task scheduled, the resources provisioned, and the services provided by the processing unit complies with the requirements of the query that is generated by the query creation unit based on the explicit and implicit constraints.

According to a second implementation of the first aspect, the database further can be configured to store at least one pre-created query, wherein the query creation unit further can be configured to extract from the database at least one pre-created query based on the received request to generate the query.

This allows to process future requests for scheduling at least one task and/or provisioning at least one resource and/or providing at least one service more effectively and efficiently.

According to a third implementation of the first aspect, the query creation unit further can be configured to store at least one query corresponding to the received request in the database in case no pre-created query corresponds to the received request.

This allows to process future requests for scheduling at least one task and/or provisioning at least one resource and/or providing at least one service more effectively and efficiently.

According to a fourth implementation of the first aspect, the database further can be configured to store at least one pre-created task schedule, and/or at least one pre-created set of resources, and/or at least one pre-created service configuration, wherein the constraint solving unit further can be configured to extract from the database at least one pre-created task schedule, and/or at least one pre-created set of resources, and/or at least one pre-created service configuration based on the received request to schedule the at least one task, and/or provision the at least one resource, and/or provide the at least one service.

This allows to process future requests for scheduling at least one task and/or provisioning at least one resource and/or providing at least one service more effectively and efficiently.

According to a fifth implementation of the first aspect, the constraint solving unit further can be configured to store at least one pre-created task schedule, and/or at least one set of resources, and/or at least one pre-created service configuration corresponding to the received request in the database in case no pre-created task schedule, and/or pre-created set of resources, and/or pre-created service configuration corresponds to the received request.

This allows to process future requests for scheduling at least one task and/or provisioning at least one resource and/or providing at least one service more effectively and efficiently.

According to a sixth implementation of the first aspect, the query creation unit further can be configured to derive the implicit constraints by analyzing a semantic of the received request.

This ensures that deriving the implicit constraints can be improved by providing a larger basis for determining the constraints (i.e. by analyzing the semantic of the received request).

According to a seventh implementation of the first aspect, the query creation unit further can be configured to identify a type of the received request and to derive the implicit constraints based on the type of the received request.

This ensures that deriving the implicit constraints can be improved by providing a larger basis for determining the constraints (i.e. by analyzing the type of the received request).

According to an eighth implementation of the first aspect, the constraint solving unit further can be configured to store a type of the received request and corresponding task information, and/or resource information, and/or service information in the database.

This allows to process future requests for scheduling at least one task and/or provisioning at least one resource and/or providing at least one service more effectively and efficiently.

According to a ninth implementation of the first aspect, the SDN controller further can include an optimization unit, configured to optimize the at least one scheduled task and/or the at least one provisioned resource and/or the at least one provided service by periodically querying the task information, and/or the resource information, and/or the service information in the database according to the generated query.

This allows to continuously and periodically optimize results of scheduling at least one task and/or provisioning at least one resource and/or providing at least one service, which enables the SDN controller to quickly react to changes of the task information, and/or the resource information, and/or the service information in the database.

According to a second aspect, the invention provides a method performed by a software defined network, SDN, controller for task scheduling and/or resource provisioning and/or service providing, the method including the steps of receiving, by a receiving unit, a request for scheduling at least one task and/or provisioning at least one resource and/or for providing at least one service; and scheduling at least one task and/or provisioning at least one resource and/or providing at least one service, by a processing unit, based on the request received by the receiving unit and on an explicit constraint defined in the received request, and/or an implicit constraint imposed by the received request.

According to a first implementation of the second aspect, the method further can include the steps of storing, in a database, task information, and/or resource information, and/or service information; extracting, by a query creation unit, the explicit constraint defined in the received request, and/or deriving, by the query creation unit, the implicit constraint imposed by the received request; generating, by the query creation unit, a query based on the explicit constraint and/or the implicit constraint; solving, by a constraint solving unit, constraints in the generated query based on the task information, and/or the resource information, and/or the service information in the database; identifying, by the constraint solving unit, a task schedule, and/or a set of resources, and/or a service configuration available for executing the received request based on the generated query and/or the task information, and/or the resource information, and/or the service information; scheduling, by the processing unit, the at least one task, and/or provisioning, by the processing unit, the at least one resource, and/or providing, by the processing unit, the at least one service based on the identified task schedule, and/or the identified set of resources, and/or the identified service configuration, and the request received by the receiving unit.

According to a second implementation of the second aspect, the method further can include, extracting, by the query creation unit from the database, at least one pre-created query based on the received request to generate the query.

According to a third implementation of the second aspect, the method further can include, storing, by the query creation unit in the database, at least one query corresponding to the received request in case no pre-created query corresponds to the received request.

According to a fourth implementation of the second aspect, the method further can include, extracting, by the constraint solving unit from the database, at least one pre-created task schedule, and/or at least one pre-created set of resources, and/or at least one pre-created service configuration based on the received request to schedule the at least one task, and/or provision the at least one resource, and/or provide the at least one service.

According to a fifth implementation of the second aspect, the method further can include storing, by the constraint solving unit in the database, at least one pre-created task schedule, and/or at least one set of resources, and/or at least one pre-created service configuration corresponding to the received request in case no pre-created task schedule, and/or pre-created set of resources, and/or pre-created service configuration corresponds to the received request.

According to a sixth implementation of the second aspect, the method further can include deriving, by the query creation unit, the implicit constraint by analyzing a semantic of the received request.

According to a seventh implementation of the second aspect, the method further can include identifying, by the query creation unit, a type of the received request; and deriving, by the query creation unit, the implicit constraint based on the type of the received request.

According to an eighth implementation of the second aspect, the method further can include storing, by the constraint solving unit, a type of the received request and corresponding task information, and/or resource information, and/or service information in the database.

According to a ninth implementation of the second aspect, the method further can include optimizing, by an optimization unit, the at least one scheduled task and/or the at least one provisioned resource and/or the at least one provided service by periodically querying, by the optimization unit, the task information, and/or the resource information, and/or the service information in the database according to the generated query.

The method of the second aspect achieves all advantages of the SDN controller of the first aspect.

According to a third aspect, the invention provides a computing system for task scheduling and/or resource provisioning and/or service providing, including a SDN controller according to the first aspect or any implementation form of the first aspect, and at least one agent, configured to monitor tasks executed, and/or resources used, and/or services provided in the computing system and to store task information, and/or resource information, and/or service information derived from the monitored resources and/or tasks and/or services in the SDN controller.

This ensure that the SDN controller can schedule at least one task and/or provision at least one resource and/or provide at least one service based on the task information, and/or resource information, and/or service information derived from the monitored resources and/or tasks and/or services.

According to a first implementation of the third aspect, the SDN controller further can be configured to submit configuration instructions to the at least one agent, wherein the at least one agent further can be configured to monitor tasks executed, and/or resources used, and/or services provided in the computing system according to the configuration instructions.

This allows the SDN controller to control the configuration of the at least one agent, when a configuration change of the at least one agent is required. This can in particular be beneficial to react to changing requirements regarding the resources, tasks or services to be monitored. This also allows to adjust a granularity and detail level of the monitoring of the tasks, resources and services. Thus, the monitoring can be adjusted to, on the one hand side, provide enough information to improve provisioning of resources, scheduling of tasks and providing of services, and on the other hand side, avoid collecting too much information, in order to improve overall performance of the computing system.

According to a second implementation of the third aspect, the at least one agent further can be configured to periodically update the task information, and/or the resource information, and/or the service information stored in the SDN controller.

This ensures that information on resources used, tasks being executed and services being provided in the computing system are constantly updated and are available as a basis for future processing.

According to a fourth aspect, the invention provides a method performed by a computing system, including the steps of monitoring, by at least one agent, tasks executed and/or resources used and/or services provided in the computing system; and storing, by the at least one agent, task information, and/or resource information, and/or service information derived from the monitored tasks, and/or resources, and/or services in a SDN controller.

According to a first implementation of the fourth aspect, the method further can include submitting, by the SDN controller, configuration instructions to the at least one agent; and monitoring, by the at least one agent, tasks executed, and/or resources used, and/or services provided in the computing system according to the configuration instructions.

According to a second implementation of the fourth aspect, the method further can include periodically updating, by the at least one agent, the task information, and/or the resource information, and/or the service information stored in the SDN controller.

The method of the fourth aspect achieves all advantages of the computing system of the third aspect.

BRIEF DESCRIPTION OF THE DRAWINGS

The above described aspects and embodiments of the present invention will now also be discussed with reference to the figures.

DETAILED DESCRIPTION OF THE EMBODIMENTS

Generally, arrangements, devices, modules, components, models, elements, units and means and so forth described in the present application may be implemented by software or hardware elements or a combination thereof. Steps which are performed by the various entities described in the present application as well as the functionality described to be performed the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or a combination thereof. Further, a method according to an embodiment of the present invention and its various steps may be embodied in the functionalities of the various described apparatus elements.

Figure 2:
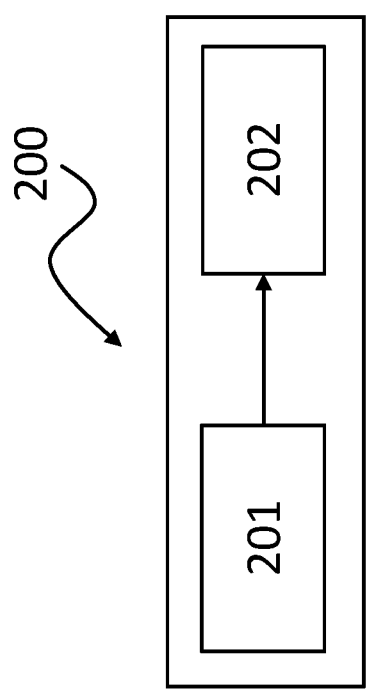
FIG. 2 shows a schematic overview of a SDN controller according to an embodiment the present invention.

FIG. 2 shows a schematic overview of a SDN controller 200 for task scheduling and/or resource provisioning and/or service providing according to an embodiment the present invention.

The SDN controller 200 comprises a receiving unit 201 and a processing unit 202. The receiving unit 201 can receive a request for scheduling at least one task and/or provisioning at least one resource and/or providing at least one service. The request can e.g. be sent by a client that is connected to the SDN controller 200 by means of a communication network. The client can in particular be a computing node located in the same communication network as the SDN controller 200. After the request is received by the receiving unit 201, it can be further processed in the processing unit 202. That is, the processing unit 202 can schedule at least one task and/or provision at least one resource and/or provide at least one service based on the request received by the receiving unit 201. More specifically, the processing unit 202 can schedule at least one task and/or provision at least one resource and/or provide at least one service additionally based on an explicit constraint defined in the received request, and/or an implicit constraint imposed by the received request.

Explicit constraints can, for example, be hardware resource requirements, such as an amount of CPU power, system memory, system storage or requirements regarding input and output devices such as network devices needed by the request.

Implicit constraints can be imposed by the received request e.g. by a semantic, a characteristic or a type of the received request.

The semantic and/or characteristic and/or type of the received request can include information about a user or client scheduling the request, the source the request is received from, or whether the request relates to e.g. audio processing, video processing, picture processing, text processing, streaming of content, providing a predefined type of task, resource, or service, or whether the request is e.g. related to security awareness, energy awareness or hardware acceleration.

An example of a request that is received by the receiving unit 201 can have a structure as it is given in the following: request (user_id, service_type, request, exp_constraints).

In the given example, the parameter "user_id" defines the identity of a user, who submits the request. The parameter "user_id" may be the same identifier that the user already utilizes to access basic functionality of the SDN controller 200. The parameter "service_type" in particular defines, whether the request relates to resource provisioning, or task scheduling, or service providing. The parameter "request" contains information regarding the resources to be provisioned or tasks to be scheduled or services to be provided. The parameter "exp_constraints" defines the explicit constraints which are included in the request. The implicit constraints are in particular imposed by all parameters of the request, i.e. by the parameters "user_id", "service_type", "request" and "exp_constraints".

Figure 3:
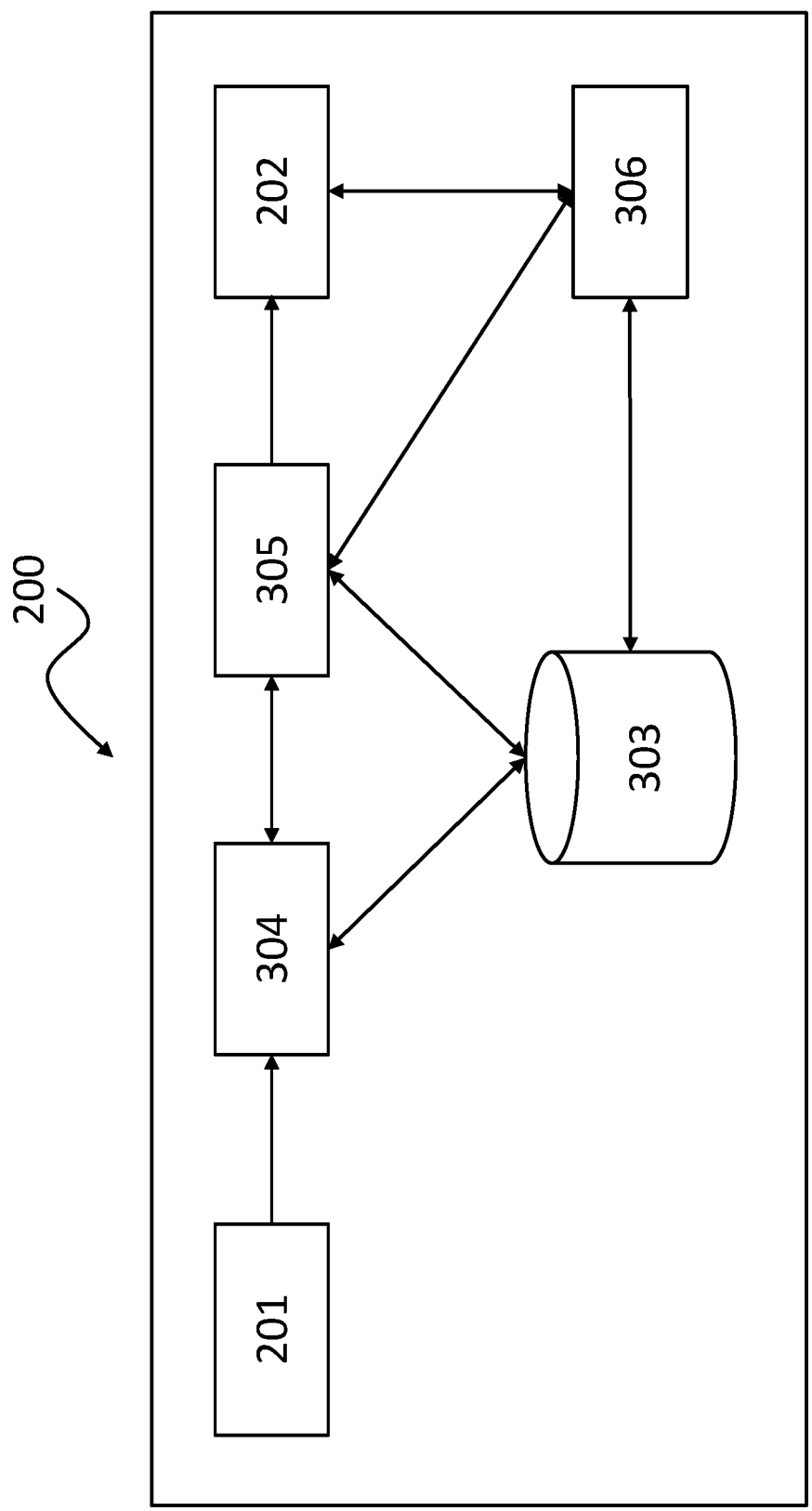
FIG. 3 shows a schematic overview of a SDN controller according to an embodiment of the present invention.

FIG. 3 shows a more detailed schematic overview of a SDN controller 200 according to an embodiment of the present invention.

Figure 1:
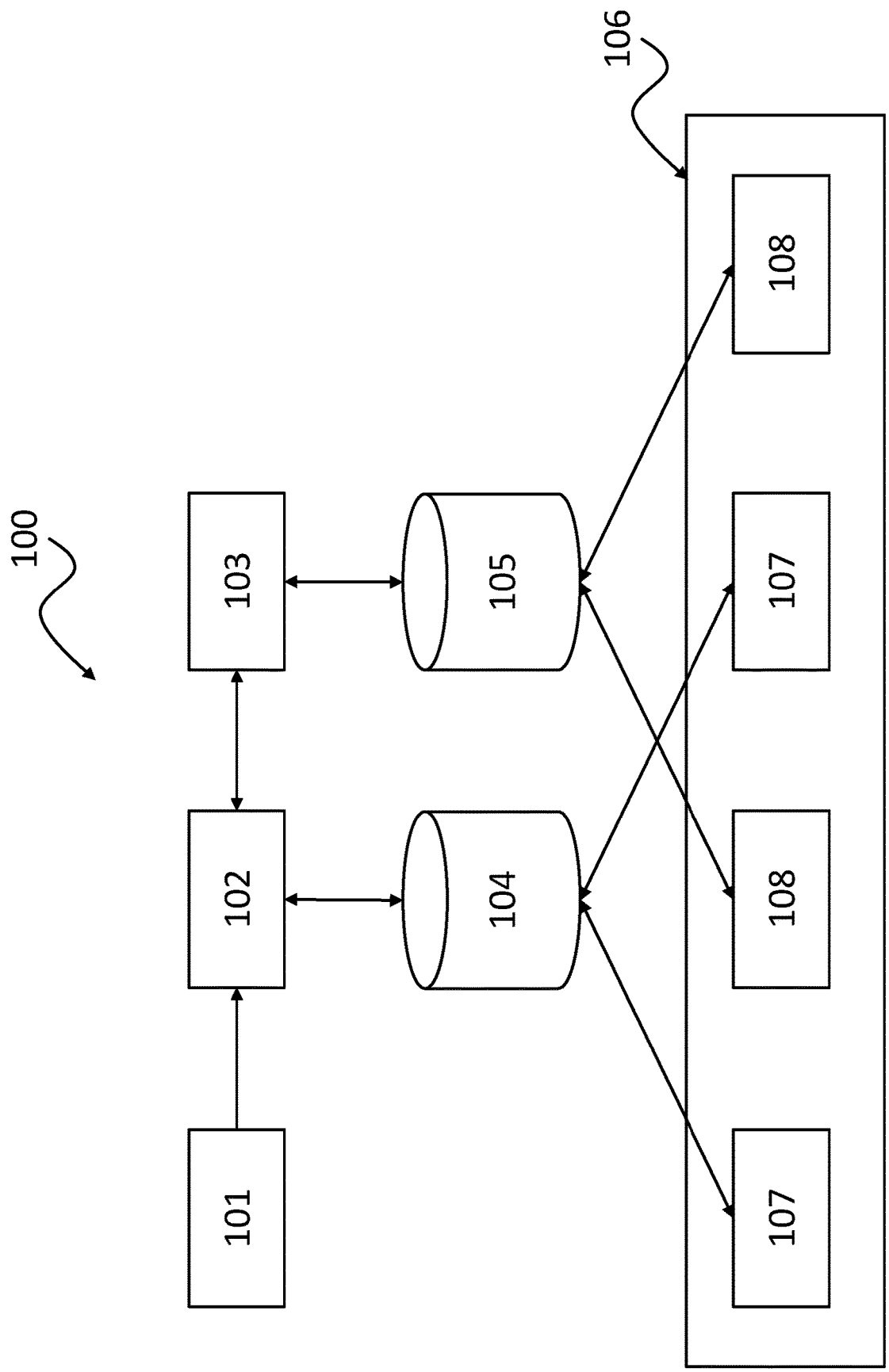
FIG. 1 shows a schematic overview of a conventional task scheduling and/or resource provisioning system and a conventional SDN controller.

The SDN controller 200 and its units include the functionality of the SDN controller 200 shown in FIG. 1, and the corresponding units as described above. Therefore, similar components are identified with the same reference signs.

The SDN controller 200 additionally can comprise a database 303. The database 303 can e.g. be a database according to the working principle of an SQL database, a Key-Value store, a NoSQL database, or simply one or more text files (e.g. a JSON-format file). The database can store task information, and/or resource information, and/or service information.

The processing unit 202 can specifically schedule the at least one task and/or provision the at least one resource and/or provide the at least one service additionally based on the task information, and/or the resource information, and/or the service information stored in the database 303.

The task information, and/or the resource information, and/or the service information can be gathered and provided to the SDN controller 200 by at least one agent. To this end, the at least one agent can monitor resources and/or tasks and/or services on a computing node or in a computing system (e.g. a datacenter), as it is going to be describe in view of FIGS. 6 and 7 below.

In order to optimize the results of the processing in the SDN controller 200, the granularity and level of detail of the gathered task information, and/or resource information, and/or service information can be adjusted.

The task information, and/or the resource information, and/or the service information can comprise information about tasks already and/or currently running in a computing system, e.g. on computing nodes of the computing system, that also employs the SDN controller 200, as well as runtime information and workload information. This information can help to improve scheduling of future tasks, provisioning of future resources or providing of future services according to an evaluation (e.g. an empirical evaluation, of previous and present runtime information), to re-schedule a presently running task or service (to e.g. react to modified system load or configuration), and/or to improve overall calculation time of the task or service presently running in the computing system. The task information, and/or the resource information, and/or the service information can also include information about the geographical distance or the network distance between monitored computing nodes. This kind of information is beneficial, when for example a critical task has to be scheduled in a datacenter in a specific location (e.g. to comply with laws or compliance policies), but also for example when network traffic between computing nodes is high and shouldn't be forwarded over too many network nodes. For example, a number can be set defining over how many links (network connections connecting computing nodes and/or datacenters) and/or network nodes a scheduled task may be distributed.

To determine the geographic position of a computing node, the computing node can further comprise a position determining module, e.g. a global positioning system (GPS) or means to detect the position of the computing node by a radio unit (e.g. by triangulation techniques). The task information, and/or resource information, and/or service information can also include information about energy and power consumption. It can be beneficial to evaluate this kind of information when processing a received request to e.g. optimize overall energy consumption of a datacenter. To determine an energy state and power consumption of a computing node, the computing node can further comprise an energy state and power consumption determining module.

The task information and/or resource information and/or service information can also include node and/or computing system architecture information, hardware configuration information, information about processing capabilities, memory capacity information, storage capacity information, and information about available devices. The task information and/or resource information and/or service information in particular can include information regarding the state or load of network devices (e.g. network interfaces, routers switches or SDN network elements), the state or load of load balancers, the state or load of firewalls, the network distances of computing nodes or datacenters, the necessity for update operations on computing nodes or datacenters, the presence of PCI or network devices in a computing node, information provided by a packet inspector, information regarding the system cache of a computing node and non-uniform memory access (NUMA) node info. It is useful to consider this kind of information when scheduling tasks, provisioning resources and providing services to increase overall system performance.

The task information and/or resource information and/or service information can also comprise temperature information. Scheduling a task, provisioning a resource or providing a service with respect to temperature information has the advantage that outage or damage of computing nodes or a computing system can be avoided by using computing nodes with a low system temperature to execute a task, provide a resource or provision a service.

The task information and/or resource information and/or service information can also comprise hypervisor information. It is beneficial to evaluate hypervisor information when scheduling a task, providing a resource, or provisioning a service, as configuration and system state of VMs and hypervisors running in a monitored computing system can be considered when for example a task or a service requires to set up a new VM or changing configuration of a running VM in the computing system.

The task information, and/or the resource information, and/or the service information can also comprise empirical runtime information or resource consumption information of currently or previously executed tasks, provisioned resources or provided services. Using this kind of information allows taking into account empirical information about previous tasks, resources and services, for example to avoid low overall system performance by evaluating the resource consumption of an identical task, resource or service that was processed previously.

In the following, it is described how the task information, and/or the resource information, and/or the service information stored in the database 303 can be evaluated by the SDN controller 200.

After a request for scheduling a task and/or provisioning a resource and/or providing a service is received in the SDN controller 200 by means of the receiving unit 201, it is forwarded to a query creation unit 304 included in the SDN controller 200. The query creation unit 304 can extract the explicit constraint defined in the received request, and/or derive the implicit constraint imposed by the received request.

The received request can e.g. include information regarding required amount of memory, CPU power, GPU power, system memory, system storage, system architecture, and information regarding compression, encryption and co-scheduling of a task. From this information, the query creation unit 304 can extract the explicit constraint defined in the received requests and also derive an implicit constraint imposed by the received request.

The implicit constraint can be derived by the query creation unit 304 by analyzing the semantic and/or characteristic of the received request 304. The query creation unit 304 can identify the type of the received request, and derives the implicit constraint based on the type of the received request.

In an example relating to a computing node placed in a communication network, a user can open a website to use online banking or e-commerce applications. From information about the website opened by the user, the query creation unit 304 can derive that this operation requires high security. The SDN controller 200 hence can set the security and network configuration of the computing node and of the communication network accordingly. Information needed to derive the implicit constraint according to the above examples can be collected, for example, by analyzing a URL of an opened website or by analyzing content loaded by the opened website.

In another example regarding the scheduling of tasks, provisioning resources and providing services in a datacenter, the query creation unit 304 can derive from a received request, whether a task or services is from a predefined field of application (such as Hadoop or Big Data, task scheduling in an Message Passing Interface (MPI) scheduler, a Spark scheduler or a CUDA scheduler) and detect what amount of CPU power, memory and system storage is needed, and provide resources accordingly. The query creation unit 304 is now described in more detail in view of FIG. 4 which shows a detailed schematic overview of a query creation unit according to an embodiment of the present invention.

The query creation unit 304 can comprise a hint collector 401, a query creator 402, and a hint information database 403. Requests for scheduling a task and/or provisioning a resource and/or providing service, which are processed by the SDN controller 200 are received by the query creation unit 304 by means of the hint collector 401. The hint collector 401 can extract explicit scheduling constraints and derive implicit scheduling constraints from the requests for scheduling a task and/or provisioning a resource and/or providing service.

This is in particular achieved by analyzing the semantic, characteristic, or type of the received request. The query creating unit 304 generates the query based on the explicit constraints and/or the implicit constraints by means of the query creator 402. The generated query is in turn forwarded to the constraint solving unit 305 by the query creator 402. In order to improve performance of generating queries, the hint collector 401 and the query creator 402 can store information about previously created queries in the hint information database 403. The hint information database 403 is provided in the same technical manner as the database 303. The hint information database 403 can in particular be included in the database 303. The information about previously created queries can include information regarding the relating request for task scheduling, resource provisioning or service providing, explicit and implicit scheduling constraints derived from the request and queries generated according to the request.

An example notation of explicit constraints, evaluated by the query creation unit 304, is given in the following. When generating a query from explicit constraints, the constraints can be, for example, as follows: C1 specifies a number of CPUs requirement, C2 specifies a memory size requirement, C3 specifies a network bandwidth requirement, C4 specifies a storage space requirement and C5 specifies a GPU presence requirement. Additional or alternative requirements could, of course, also be specified.

An example notation of a query that is created by the query creation unit 304 and considers the above described constraints could be:

"get_schedule (C1, C2, C3, C4, C5)" or
"get_schedule (4, 500 MB, 1 Gb/s, 1 GB, yes)".

It can be seen that the query requires an amount of more than 4 CPUs, more than 500 MB system memory, a network interface providing speed of more than 1 Gb/s, system storage of larger than 1 GB and a GPU to be provided to a task or a service.

Other explicit scheduling constraints evaluated by the query creation unit 304 when creating a query can be explicit references regarding: awareness for energy and/or power consumption, compliance with security-policies and/or presence of predefined security-settings, presence of predefined hardware devices, support for co-scheduling and the requirement of a task to be scheduled in or as a VM.

An example of implicit scheduling constraints, evaluated by the query creation unit 304, is given in the following:

In case that a request for scheduling at least one task and/or provisioning at least one resource and/or providing at least one service requires at least two computing nodes to communicate—e.g. because resources of multiple computing nodes have to be assigned to a single task—geographical distance and/or network distance of the involved computing nodes can be considered by the query creation unit 304 as an implicit scheduling constraint to minimize communication overhead (e.g. network traffic) between the involved computing nodes. The geographical distance and/or network distance can in particular be determined by the SDN controller 200.

Turning back to FIG. 3, it is now described how a query that is created by the query creation unit 304 is further processed in a constraint solving unit 305.

Once the query that is created by the query creation unit 304 is received by the constraint solving unit 305, the constraint solving unit 305 solves constraints in the generated query based on the task information, and/or the resource information, and/or the service information that is stored in the database 303. The constraint solving unit 305 specifically solves the implicit and explicit constraints provided in the query by evaluating the task information, and/or the resource information, and/or the service information in the database 303. To this end, the constraint solving unit 305 can in particular be based on the working principle of a solver for Boolean satisfiability problems (SAT solver). Depth-first search (DFS), an algorithm for traversing or searching tree or graph data structures, can be used by the constraint solving unit 305 to evaluate the scheduling information.

This enables the constraint solving unit 305 to identify a task schedule, and/or a set of resources, and/or a service configuration available for executing the received request based on the generated query, and/or the task information, and/or the resource information, and/or the service information.

The task information, and/or the resource information, and/or the service information which is evaluated by the constraint solving unit 305, in order to process the query can in particular comprise information about previous requests received by the SDN controller 200, such as type, semantics or characteristics of the previous requests and corresponding information such as explicit and implicit constrains, hardware resources assigned to a task or service as a result of the previous request, and runtime behavior of the task or service. The constraint solving unit 305 can store, update and read the above described information in the database 303. By this, runtime information such as e.g. performance and place (e.g. the node on which a task or service is executed in the datacenter) of a presently scheduled task or a presently provided service can be evaluated and scheduling of future tasks, provisioning of future resources and providing future services can be improved.

After the query is processed in the constraint solving unit 305, the processing unit 202 schedules at least one task, and/or provisions at least one resource, and/or provides at least one service based on the identified task schedule, and/or the identified set of resources, and/or the identified service configuration, and the request received by the receiving unit 201.

Scheduling the at least one task, and/or provisioning the at least one resource, and/or providing the at least one service by the processing unit 202 can directly affect the processing of computing nodes in a datacenter, in particular the datacenter in which the SDN controller 200 is employed. The processing of the computing nodes or the datacenter can specifically be changed according to the identified task schedule, and/or the identified set of resources, and/or the identified service configuration, and the request received by the receiving unit 201, for example, by assigning a computation task or a service to one or more computing nodes. In another example, the identified set of resources can include information about in which part of a datacenter (e.g. by which computing node or which CPU-core or GPU-core of a computing node in a datacenter) a task or service is to be executed.

In order to improve the processing of requests received by the SDN controller 200, the database 303 can store a pre-created query resulting from e.g. previous requests for scheduling a task and/or provisioning a resource and/or providing a service. To increase overall system performance, the query creation unit 304 can extract from the database 303 at least one pre-created query based on the received request to schedule the task, and/or provision the resource, and/or provide the service. In case that no suitable query can be found in the database 303 for a presently received request, the query creation unit 304 can store at least one new query corresponding to the received request in the database 303. This allows future requests to be processed more efficiently. The query creation unit 304 can also update a pre-created query stored in the database 303 to adapt the pre-created query e.g. to a change of task information, and/or the resource information, and/or the service information in the database 303.

The database 303 can further store a pre-created task schedule, and/or a pre-created set of resources, and/or a pre-created service configuration resulting from e.g. previous requests for scheduling a task and/or provisioning a resource and/or providing a service. To increase overall system performance, the constraint solving unit 305 can extract from the database 303 at least one pre-created task schedule, and/or at least one pre-created set of resources, and/or at least one pre-created service configuration based on the received request to schedule the task, and/or provision the resource, and/or provide the service. In case that no suitable task schedule, and/or set of resources, and/or service configuration can be found in the database 303 for a received request, the constraint solving unit 305 can store at least one new task schedule, and/or set of resources, and/or service configuration in the database 303. This allows future requests to be processed more efficiently. The constraint solving unit 305 can also update a pre-created task schedule, and/or a pre-created set of resources, and/or a pre-created service configuration stored in the database 303 to adapt the pre-created task schedule, and/or the pre-created set of resources, and/or the pre-created service configuration e.g. to a change of task information, and/or the resource information, and/or the service information in the database 303.

The SDN controller 200 additionally can include an optional optimization unit 306. The optimization unit 306 can optimize the at least one scheduled task and/or the at least one provisioned resource and/or the at least one provided service by periodically querying the task information, and/or the resource information, and/or the service information in the database 303 according to the generated query. The optimization in particular affects processing effectiveness and efficiency of task, resources and services. To this end, the dynamic optimizer 306 employs interfaces to, and exchanges information with the database 303, the constraint solving unit 305 and the processing unit 202. Results of optimizing the at least one scheduled task and/or the at least one provisioned resource and/or the at least one provided service can be stored in the database 303 by the dynamic optimizer 306 to provide a basis for future optimizations.

Figure 5:
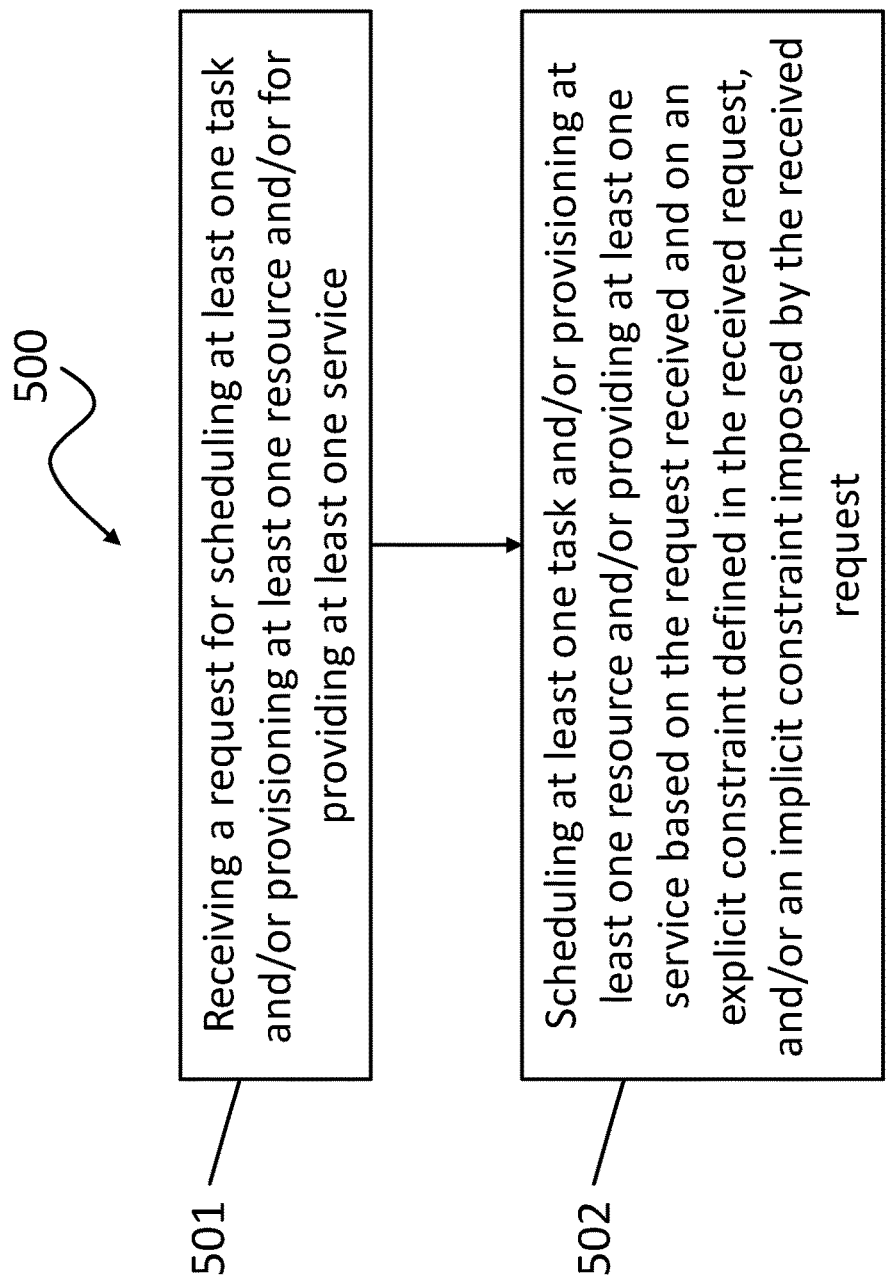
FIG. 5 shows a flow-diagram of a method according to an embodiment of the present invention.

FIG. 5 shows a flow-diagram of a method 500 according to an embodiment of the present invention. Preferably, the method is performed by the SDN controller 200 as described above.

The method 500 comprises a first step of receiving 501, by the receiving unit 201, a request for scheduling at least one task and/or provisioning at least one resource and/or for providing at least one service.

Further, the method 500 comprises a second step of scheduling 502 at least one task and/or provisioning at least one resource and/or providing at least one service, by the processing unit 202, based on the request received by the receiving unit 201 and on an explicit constraint defined in the received request, and/or an implicit constraint imposed by the received request.

Figure 6:
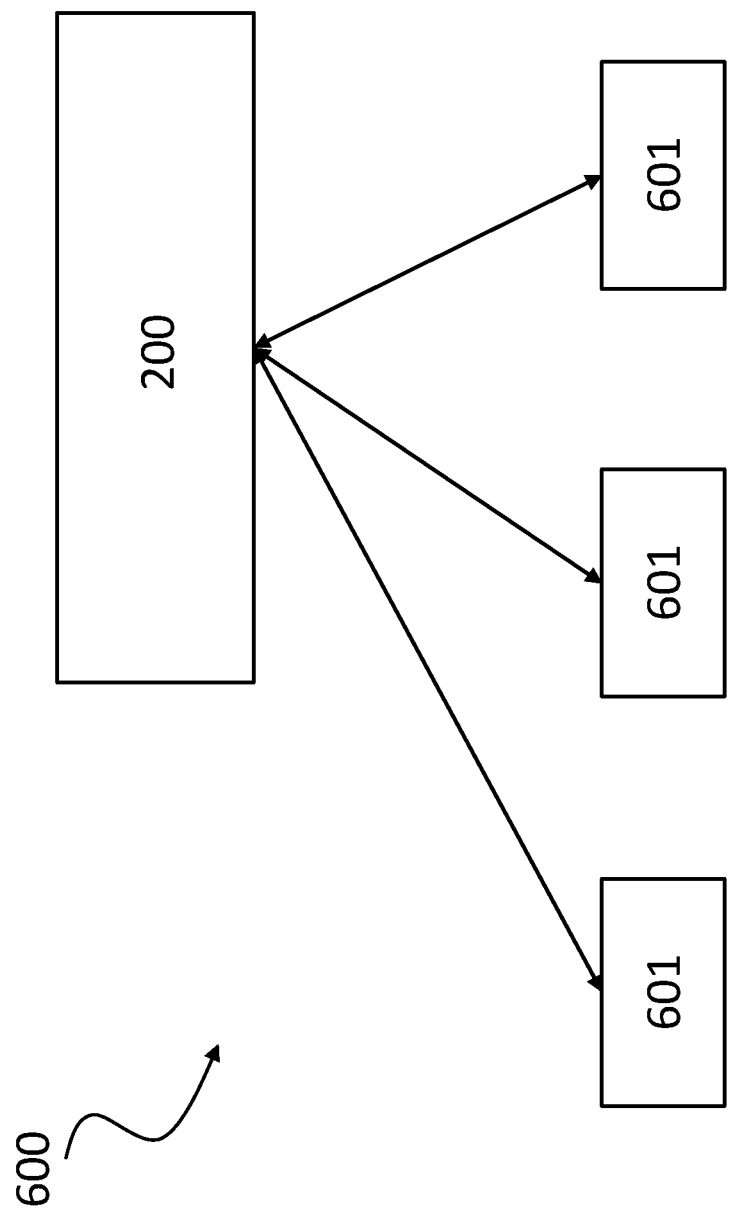
FIG. 6 shows a schematic overview of a computing system according to an embodiment the present invention.

FIG. 6 shows a schematic overview of a computing system 600 according to an embodiment the present invention.

The computing system 600 comprises the SDN controller 200 and at least one agent 601. The computing system 600 generally allows to monitor, by the at least one agent 601, tasks executed, and/or resources used, and/or services provided in the computing system 600. The at least one agent 601 can store task information, and/or resource information, and/or service information derived from the monitored resources and/or tasks and/or services in the SDN controller 200. In FIG. 6, three agents 601 are exemplarily shown, while the invention is, of course, not limited to three agents 601.

When monitoring the tasks executed, and/or the resources used, and/or the services provided in the computing system 600, the at least one agent 601 can in particular gather all the kinds of task information and/or resource information and/or service information as it is described above in view of FIG. 3.

Figure 7:
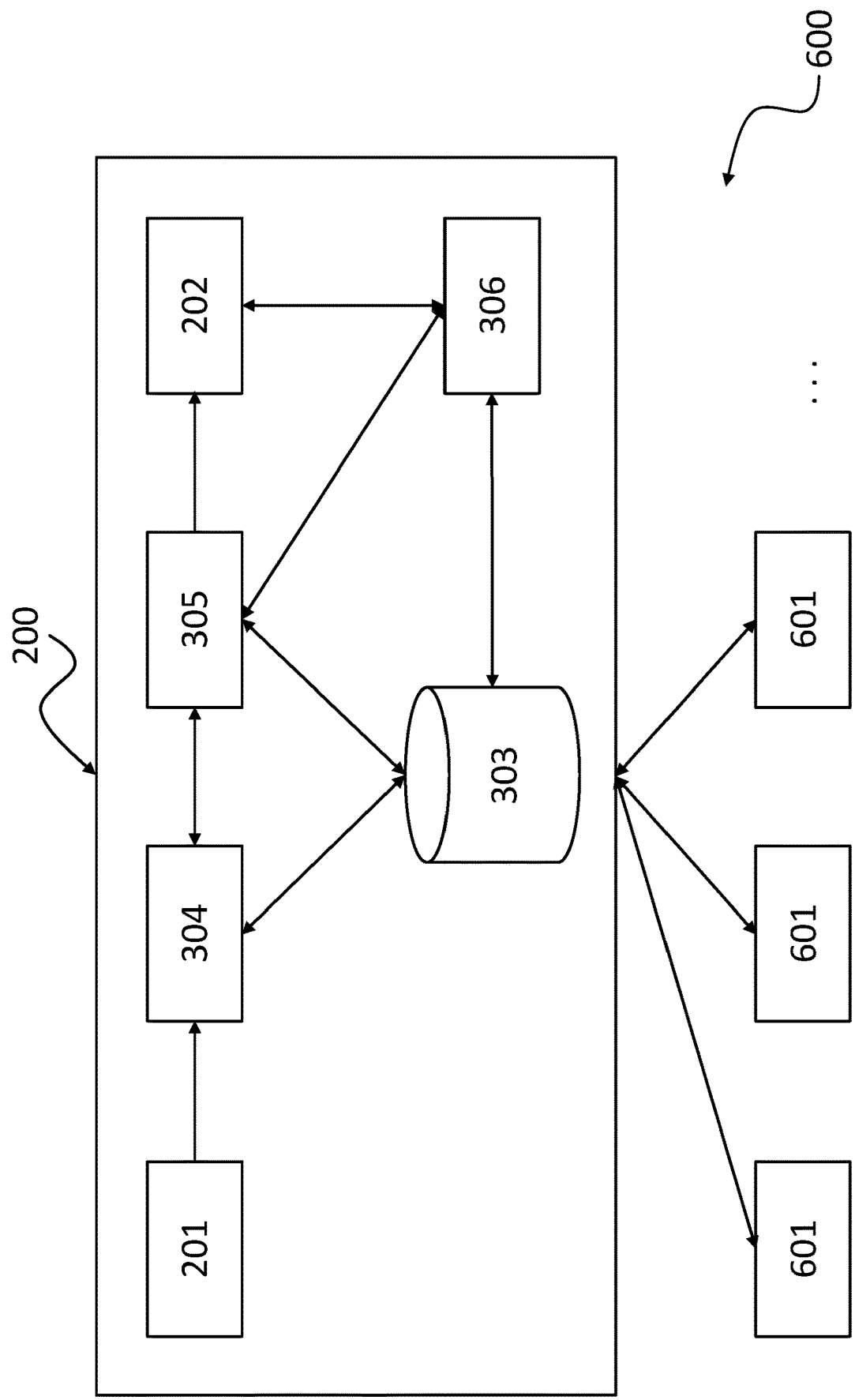
FIG. 7 shows a schematic overview of a computing system according to an embodiment of the present invention.

FIG. 7 shows a detailed schematic overview of a computing system 600 according to an embodiment of the present invention, which bases on the computing system 600 shown in FIG. 6.

The computing system 600 comprises the SDN controller 200 and the at least one agent 601. The computing system 600 and its components include the functionality of the SDN controller 200 and the computing system 600 shown in FIG. 6 and its corresponding components described above. Therefore, similar components are identified with the same reference signs. In FIG. 7, three agents 601 are exemplarily shown, while the invention is, of course, not limited to three agents 601.

In the computing system 600, the SDN controller 200 further can be configured to submit configuration instructions to the at least one agent 601. In turn, the at least one agent 601 can monitor tasks executed, and/or resources used, and/or services provided in the computing system 600 according to the configuration instructions.

The SDN controller 200 can be configured by means of configuration information that is supplied to the SDN controller 200. The SDN controller 200 evaluates the configuration information supplied, and determines if a configuration change of the at least one agent 601 is required as a result of evaluating the configuration information. If a configuration change of the at least one agent 601 is required, the SDN controller 200 sends respective configuration instructions to the at least one agent 601. The at least one agent 601 then updates its configuration based on the configuration instructions.

The at least one agent 601 then monitors tasks executed, and/or resources used, and or services provided in the computing system 600 depending on its initial configuration and/or configuration instructions received from the SDN controller 200. The at least one agent 601 gathers task information and/or resource information and/or service information about the monitored tasks executed and/or resources used and/or services provided, and stores these information in the database 303 of the SDN controller 200. For example, the at least one agent 601 can send a query to the database 303 to store task information and/or resource information and/or service information.

The at least one agent 601 can further be configured to store task information and/or resource information and/or service information in the database 303 on request or periodically, i.e. at predetermined time intervals. As a result, information on resources used, tasks being executed and services being provided in the computing system 600 are constantly updated and available as a basis for future processing.

To allow for an efficient updating of the information in the database 303, only incremental information can be transmitted from the at least one agent 601 to the database 303. The database 303 can store and update discrete values of the task information and/or resource information and/or service information based on the task information and/or resource information and/or service information received from the at least one agent 601. The database 303 can also store and update a development of values of the task information and/or resource information and/or service information over time to in particular enable comparing and evaluating previously stored information to improve future processing, e.g. by the processing unit 202 or the constraint solving unit 305.

As stated above, the SDN controller 200 submits configuration instructions to the at least one agent 601 based on configuration information. The configuration information may be provided by a database (such as an SQL database, a Key-Value store, a NoSQL database, etc.), which can also be the database 303, or simply one or more text files (e.g. in a JSON-format). According to the configuration information, a granularity and detail level of the monitoring of the tasks, resources and services can be adjusted. Thus, the monitoring can be adjusted to, on the one hand, provide enough information to improve provisioning of resources, scheduling of tasks and providing of services, and on the other hand, avoid collecting too much information to improve overall performance of the computing system 600.

The configuration information can be generated by user input but can also be selected from predefined configuration information in the SDN controller 200. The configuration information can be selected automatically by the SDN controller 200, depending on the hardware resources, tasks or services that should be monitored.

Moreover, depending on the available resources (i.e. hardware or software resources to be monitored), a datacenter setup or architectures employed, the SDN controller 200 may choose suitable configuration information. The SDN controller 200 can also periodically check the configuration information to detect configuration information changes and can update the configuration of the at least one agent 601 accordingly. It is in particular possible for the SDN controller 200 to detect configuration changes in the computing system 600, which are communicated to the SDN controller 200 by the at least one agent 601. The SDN controller 200 can hence react to the changed configuration of the computing system 600 by sending configuration instructions adapted to the changed configuration of the computing system 600 to the at least one agent 601.

The computing system 600 can further comprise at least one computing node, but typically a number of computing nodes. To facilitate ease of illustration, the computing nodes are not shown in FIG. 7. Each computing node can execute at least one agent 601. The computing nodes can be heterogeneous, i.e. they can differ in their configuration. Each computing node can for example be equipped with different hardware resources (e.g. different CPU and/or GPU architecture, memory, storage, etc.). The computing nodes can e.g. be single-core, as well as multi-core nodes. The computing nodes can also differ regarding their general system architecture. It is also possible to mix physical and virtualized computing nodes (e.g. VMs) in the same computing system 600. However, the computing nodes can as well be homogeneous in architecture and/or configuration.

The at least one agent 601 can monitor tasks executed and/or resources used and/or services provided on at least one computing node. At least one agent 601 can be executed on each of the above described computing nodes (e.g. computing nodes having a different hardware configuration, hardware architecture, or being physical as well as virtualized computing nodes) and the agent 601 can store and update task information and/or resource information and/or service information relating to the respective computing node in the database 303. Thus, the SDN controller 303, specifically the constraint solving unit 305 or the processing unit 202, can use the task information and/or the resource information and/or the service information collected from the computing nodes to process a request for scheduling a task and/or provisioning a resource and/or providing a service in a heterogeneous datacenter. Being able to execute more than one agent 601 on a computing node allows to have separate information collected by separate agents 601, e.g. for security or performance purposes. For example, it is possible to execute one agent 601 on the computing node to only collect resource information by monitoring resources used on the computing node and to simultaneously execute a second agent 601 on the same computing node to exclusively collect task information by monitoring tasks executed on the computing node. In another example it is possible to separately monitor two or more VMs running on the same computing node by two or more agents 601 executed on the same computing node. The computing system 600 can also comprise computing nodes that do not execute an agent 601.

A computing node can in particular be an SDN based network element, e.g. switch. Thus, it is possible for he at least one agent 601 to monitor tasks executed and/or resources used and/or services provided on at least one network element, gather task information and/or resource information and/or service information about the monitored tasks executed and/or resources used and/or services provided and store these information in the database 303 of the SDN controller 200.

In the computing system 600, the scheduling of the at least one task, and/or provisioning of the at least one resource, and/or providing the at least one service by the processing unit 202 can directly affect the processing of the computing nodes according to the operating principle as it is described above in view of FIGS. 3 and 5.

Figure 8:
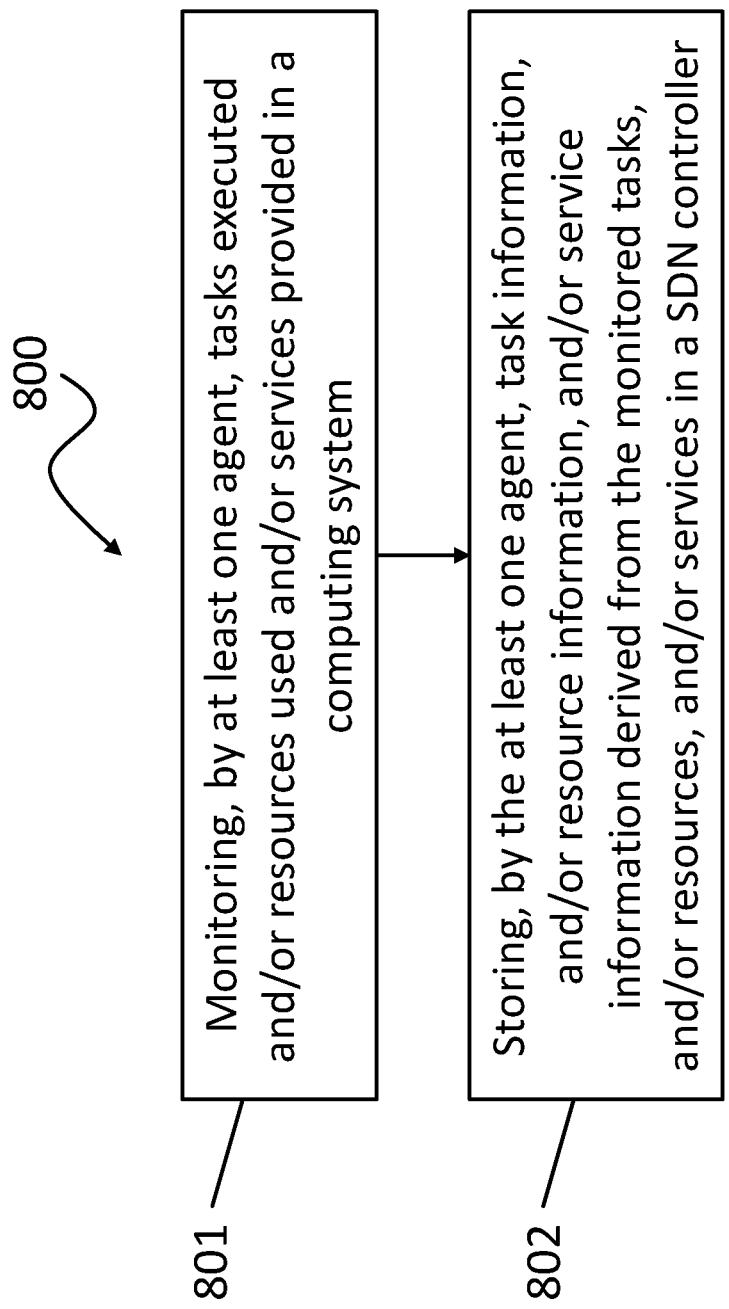
FIG. 8 shows a flow-diagram of a method according to an embodiment of the present invention.

FIG. 8 shows a flow-diagram of a method 800 according to an embodiment of the present invention. Preferably, the method is performed by the computing system 600 described above.

The method 800 comprises a first step of monitoring 801, by at least one agent 601, tasks executed and/or resources used and/or services provided in a computing system 600.

Further, the method 800 comprises a second step of storing 802, by the at least one agent 601, task information, and/or resource information, and/or service information derived from the monitored tasks, and/or resources, and/or services in the SDN controller 200.

Instructions for performing each of the described methods, in particular as described in view of FIG. 6 and FIG. 8, can be stored on a storage medium each. The storage medium may be a computer readable storage medium, such as, but is not limited to, any type of disk including floppy disks, optical disks, CD-ROMs, DVDs, magnetic-optical disks, read-only memories (ROMs), random access memories (RAMs), erasable programmable read-only memories (EPROMs), electrically erasable programmable read-only memories (EEPROMs), magnetic or optical cards, application specific integrated circuits (ASICs), or any type of media suitable for storing electronic instructions, and each coupled to a computer system bus.

Figure 9:
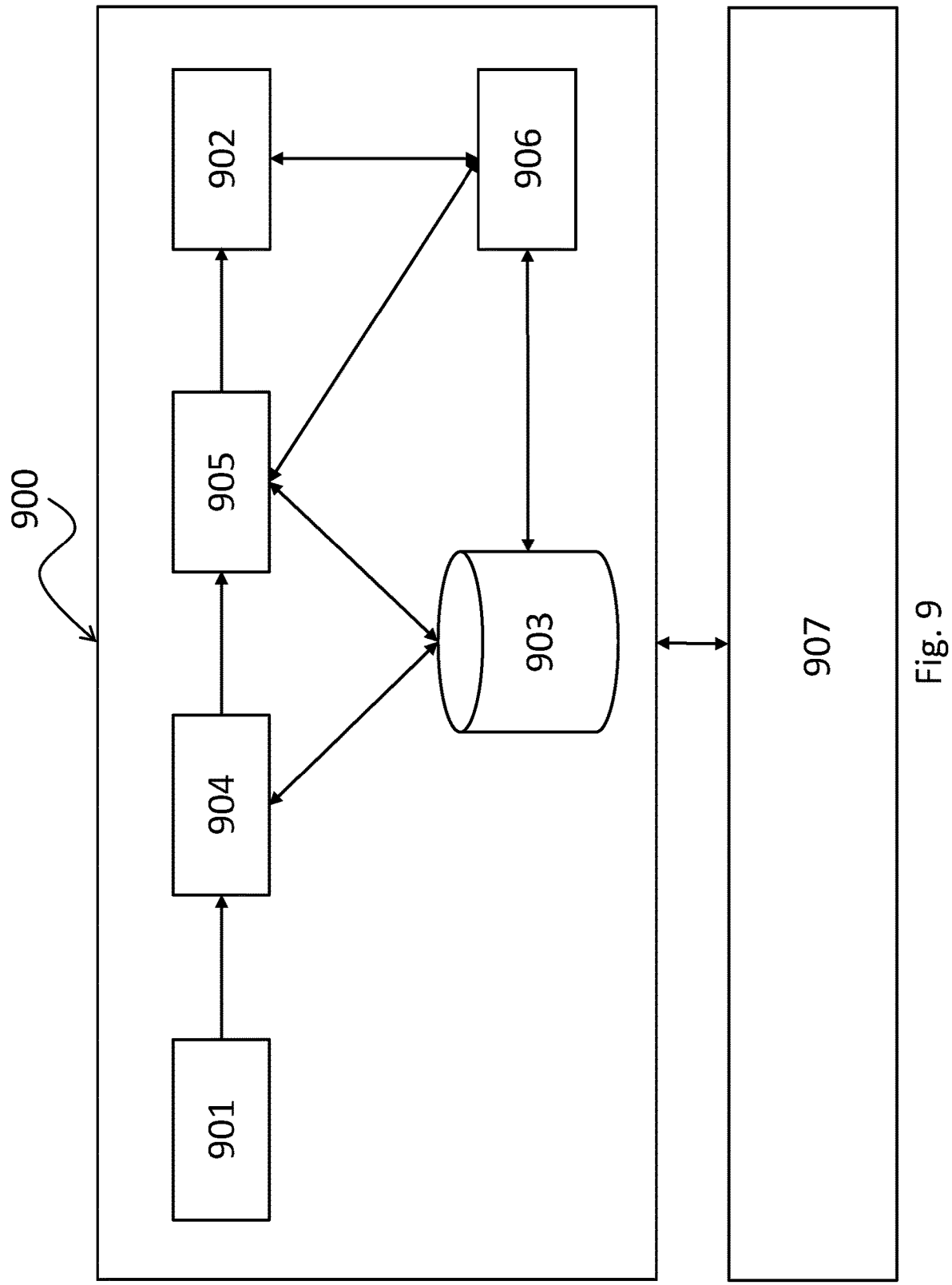
FIG. 9 shows a detailed schematic overview of an agent according to the present invention.

FIG. 9 shows a schematic overview of an agent 900 according an embodiment of the present invention.

The agent 900 includes a monitoring unit 901, a local processing unit 902, a local database 903, a local query creation unit 904, a local constraint solving unit 905 and a local optimization unit 906. The agent 900 may include the features and functionality of the agents 601 described in view of the FIGS. 6 and 7 above.

The monitoring unit 901 monitors tasks executed, and/or resources used, and/or services provided on a computing node 907 and stores task information, and/or resource information, and/or service information derived from the monitored resources and/or tasks and/or services in the local database 903.

The local database 903 can store and update discrete values of the task information and/or resource information and/or service information. The local database 903 can also store and update a development of values of the task information and/or resource information and/or service information over time to in particular enable comparing and evaluating previously stored information to improve future processing, e.g. by the processing unit 202 or the constraint solving unit 305 or the local processing unit 902 or the local constraint solving unit 905.

In order to enable further processing of the task information, and/or the resource information, and/or the service information in the SDN controller 200, the task information, and/or resource information, and/or service information stored in the local database 903 can be exchanged with the database 303 of the SDN controller 200, e.g. by means of a communication network.

The monitoring unit 901 stores very fine grained task information, and/or resource information, and/or service information in the local database 903 which is derived from the resources and/or tasks and/or services monitored on the computing node 907. The agent 900 specifically allows to adjust the granularity of the task information, and/or resource information, and/or service information that is exchanged between the local database 903 and the database 303. More specifically, fine grained (i.e. very detailed) information can be gathered by the monitoring unit 901 and stored in the local database 903, while only coarse grained information (i.e. information including less details) is transmitted to the database 303 of the SDN controller 200.

Thus, the monitoring and the exchange of information can be adjusted to, on the one hand side, provide enough information to improve provisioning of resources, scheduling of tasks and providing of services in the SDN controller 200 and, on the other hand side, avoid collecting too much information to improve overall performance of the SDN controller 200.

In addition, the local processing unit 902, the local database 903, the local query creation unit 904, the local constraint solving unit 905 and the local optimization unit 906 include the functionality of the processing unit 202, the database 303, the query creation unit 304, the constraint solving unit 305 and the optimization unit 306 as described in view of FIG. 3. This allows to outsource processing from units of the SDN controller 200 to corresponding local units of the agent 900. For example, the local database 903 can support the database 303, the local query creation unit 904 can support the query creation unit 304, the local constraint solving unit 905 can support the constraint solving unit 305, the local optimization unit 906 can support the optimization unit 306 and the local processing unit 902 can support the processing unit 202. As a result, agents 900 can contribute to the processing of the SDN controller 200 and enable scalability of a computing system employing the SDN controller 200 and agents 900.

Figure 4:
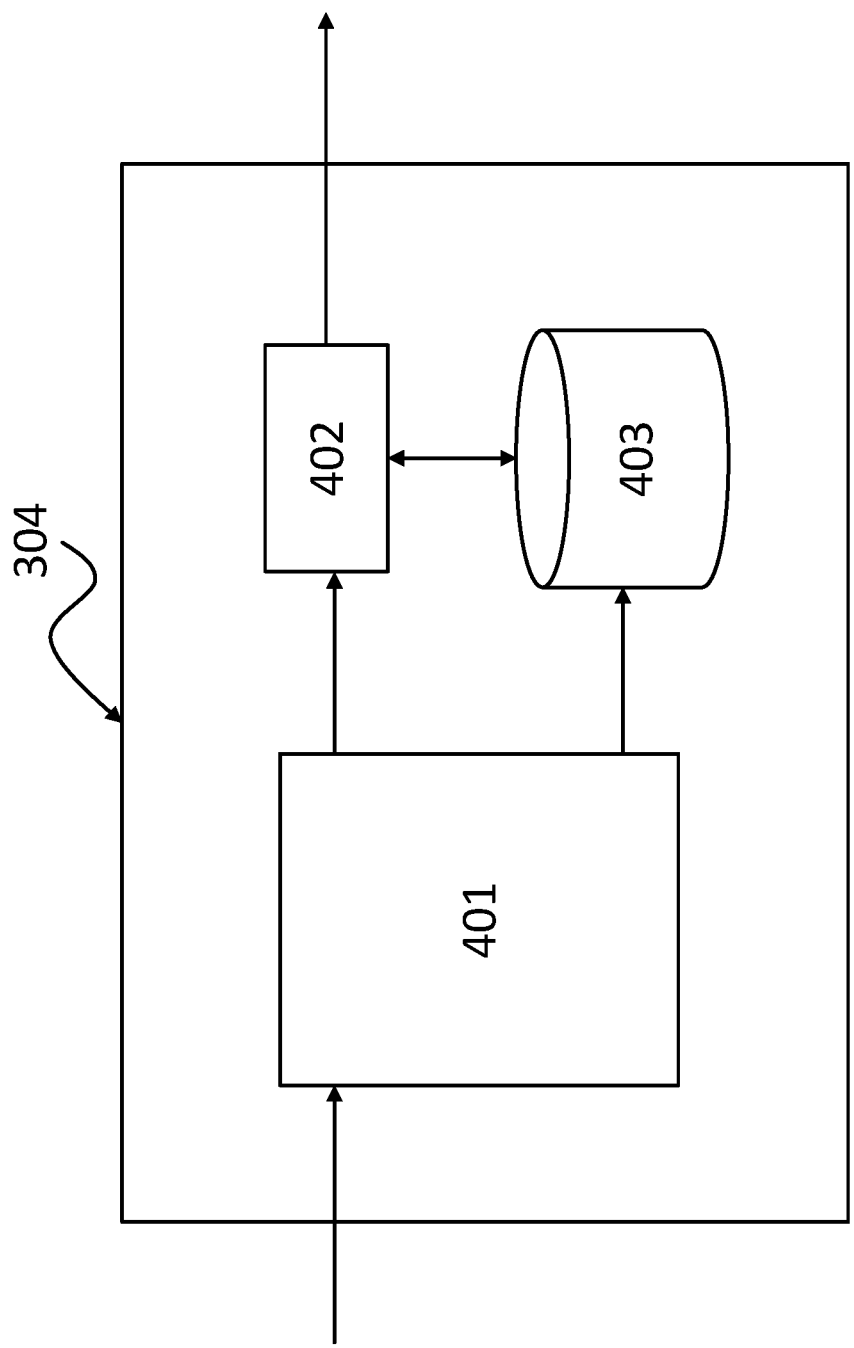
FIG. 4 shows a schematic overview of a query creation unit according to the present invention.

In a specific implementation example, the agent 900 additionally includes a local receiving unit and includes all functionality of the SDN controller 200 as described in view of FIGS. 2, 3 and 4. This enables the agent 900 to schedule tasks, and/or provision resources, and/or provide services autonomously.

The invention has been described in conjunction with various embodiments herein. However, other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless telecommunication systems.

Additionally, statements made herein characterizing the invention refer to an embodiment of the invention and not necessarily all embodiments.

What is claimed is:

1. A software defined network (SDN) controller, comprising:
   a receiver configured to receive a request for scheduling at least one task;
   at least one hardware processor configured to schedule at least one task based on the request and further based on an explicit constraint defined in the request; and
   a database configured to store task information;
   wherein the at least one processor is further configured to:
      extract the explicit constraint;
      generate a query based on the explicit constraint;
      solve one or more constraints in the query based on the task information; and
      execute the request based on the query and/or the task information;
   wherein scheduling the at least one task is further based on an identified task schedule wherein generating the query based on the explicit constraint is based on one or more requirements specified in the explicit constraint, wherein the one or more requirements comprise at least one of hardware, bandwidth, power consumption, or security setting requirements for executing the request.

2. The SDN controller according to claim 1, wherein executing the request based on the query and/or the task information comprises:
   identifying the task schedule based on the query and/or the task information.

3. The SDN controller according to claim 1, wherein the database is further configured to store at least one pre-created query, wherein the at least one processor is further configured to extract from the database at least one pre-created query based on the request to generate the query.

4. The SDN controller according to claim 1, wherein the at least one processor is further configured to store at least one query corresponding to the request in the database in case no pre-created query corresponds to the request.

5. The SDN controller according to claim 1, wherein the database is further configured to store at least one pre-created task schedule, wherein the at least one processor is further configured to extract from the database the at least one pre-created task schedule based on the request to schedule the at least one task.

6. The SDN controller according to claim 1, wherein the at least one processor is further configured to store at least one pre-created task schedule corresponding to the request in the database in case no pre-created task schedule corresponds to the request.

7. The SDN controller according to claim 1, wherein scheduling the at least one task is further based on an implicit constraint imposed by the request;
   wherein the at least one processor is further configured to derive the implicit constraint; and
   wherein generating the query is further based on the implicit constraint.

8. The SDN controller according to claim 7, wherein the at least one processor is further configured to identify a type of the request and to derive the implicit constraint based on the type of the request.

9. The SDN controller according to claim 1, wherein the at least one processor is further configured to store a type of the request and corresponding task information.

10. The SDN controller to claim 2, wherein the SDN controller is further configured to optimize the at least one scheduled task by periodically querying the task information in the database according to the query.

11. A method comprising:
receiving, by a software defined network (SDN) controller, a request for scheduling at least one task;
extracting, by the SDN controller, an explicit constraint defined in the request;
generating, by the SDN controller, a query based on the explicit constraint;
solving, by the SDN controller, one or more constraints in the query based on task information from a database;
executing, by the SDN controller, the request based on the query and/or the task information; and
scheduling, by the SDN controller, at least one task based on the request and further based on the explicit constraint;
wherein scheduling the at least one task is further based on an identified task schedule;
wherein generating the query based on the explicit constraint is based on one or more requirements specified in the explicit constraint, wherein the one or more requirements comprise at least one of hardware, bandwidth, power consumption, or security setting requirements for executing the request.

12. A software defined network (SDN) controller, comprising:
a receiver configured to receive a request for provisioning at least one resource;
at least one hardware processor configured to provision at least one resource based on the request and further based on an explicit constraint defined in the request; and
a database configured to store resource information;
wherein the at least one processor is further configured to: extract the explicit constraint;
generate a query based on the explicit constraint;
solve one or more constraints in the query based on the resource information; and
execute the request based on the query and/or the resource information;
wherein provisioning the at least one resource is further based on an identified set of resources;
wherein generating the query based on the explicit constraint is based on one or more requirements specified in the explicit constraint, wherein the one or more requirements comprise at least one of hardware, bandwidth, power consumption, or security setting requirements for executing the request.

13. The SDN controller according to claim 12, wherein executing the request based on the query and/or the resource information comprises:
identifying the set of resources based on the query and/or the resource information.

14. The SDN controller according to claim 12, wherein the database is further configured to store at least one pre-created query, wherein the at least one processor is further configured to extract from the database at least one pre-created query based on the request to generate the query.

15. The SDN controller according to claim 12, wherein the at least one processor is further configured to store at least one query corresponding to the request in the database in case no pre-created query corresponds to the request.

16. The SDN controller according to claim 12, wherein the database is further configured to store at least one pre-created set of resources, wherein the at least one processor is further configured to extract from the database the at least one pre-created set of resources based on the request to provision the at least one resource.

17. The SDN controller according to claim 7, wherein the at least one processor is further configured to derive the implicit constraint by analyzing a semantic of the request.

18. The SDN controller according to claim 7, wherein deriving the implicit constraint comprises deriving a security-related constraint based on a type of website relating to the request.

19. The SDN controller according to claim 7, wherein deriving the implicit constraint comprises distinguishing between whether the request relates to Hadoop or big data, whether the request relates to a message passing interface (MPI) scheduler, whether the request relates to a Spark scheduler, and whether the request relates to a Compute Unified Device Architecture (CUDA) scheduler.

20. The SDN controller according to claim 1, wherein the explicit constraint specifies hardware, bandwidth, power consumption, and security setting requirements for executing the request.

* * * * *